United States Patent
Sarwari et al.

(10) Patent No.: US 8,717,448 B2
(45) Date of Patent: *May 6, 2014

(54) SYNCHRONIZED MULTIPLE IMAGER SYSTEM AND METHOD

(75) Inventors: Atif Sarwari, Saratoga, CA (US);
Naveed Alam, Cupertino, CA (US);
Khurshed Mazhar, Redmond, WA (US)

(73) Assignee: Altia Systems, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/568,575

(22) Filed: Aug. 7, 2012

(65) Prior Publication Data

US 2013/0063551 A1    Mar. 14, 2013

Related U.S. Application Data

(63) Continuation of application No. 12/538,147, filed on Aug. 9, 2009, now Pat. No. 8,253,815.

(60) Provisional application No. 61/136,579, filed on Sep. 16, 2008.

(51) Int. Cl.
*H04N 5/225* (2006.01)
*H04N 7/00* (2011.01)

(52) U.S. Cl.
USPC ............................. 348/218.1; 348/38

(58) Field of Classification Search
USPC ............................. 328/38, 218.1
See application file for complete search history.

(56) References Cited

U.S. PATENT DOCUMENTS

| 4,974,073 | A | * | 11/1990 | Inova | 348/38 |
|---|---|---|---|---|---|
| 5,226,063 | A | | 7/1993 | Higashitsutsumi | |
| 5,650,814 | A | * | 7/1997 | Florent et al. | 348/39 |
| 7,164,113 | B2 | * | 1/2007 | Inokuma et al. | 250/208.1 |
| 7,215,364 | B2 | * | 5/2007 | Wachtel et al. | 348/218.1 |
| 7,339,614 | B2 | * | 3/2008 | Gruber et al. | 348/218.1 |
| 7,619,658 | B2 | | 11/2009 | Baker et al. | |
| 7,646,404 | B2 | | 1/2010 | Liu et al. | |
| 8,009,200 | B2 | | 8/2011 | Goh et al. | |
| 8,072,504 | B2 | * | 12/2011 | Hunter et al. | 348/222.1 |
| 8,253,815 | B2 | | 8/2012 | Sarwari et al. | |
| 8,355,042 | B2 | * | 1/2013 | Lablans | 348/36 |
| 2009/0278947 | A1 | | 11/2009 | Schultz | |

* cited by examiner

*Primary Examiner* — Ngoc-Yen Vu

(74) *Attorney, Agent, or Firm* — Hahn & Moodley LLP; Vani Moodley, Esq.

(57) ABSTRACT

One embodiment relates to a synchronized multiple imager system includes a plurality of imagers. One or more respective sensors are coupled to the imagers. The sensors output a vertical raster stream representative of pixel data from pixel columns, thereby generating a plurality of vertical raster streams. A clock circuit synchronizes the sensors to sense selected columns in the imagers and to output the vertical raster streams from the selected columns. A processor circuit stitches seam vertical raster streams from adjacent pairs of imagers. The synchronized multiple imager system may further include a plurality of input buffers coupled to respective sensors. The clock circuit may include input flip-flops configured to acquire the vertical raster stream from respective imagers in accordance with an imager bus clock. The clock circuit may further include asynchronous FIFOs to de-skew the vertical raster streams. Other embodiments, aspects and features are also disclosed.

25 Claims, 6 Drawing Sheets

US 8,717,448 B2

SYNCHRONIZED MULTIPLE IMAGER SYSTEM AND METHOD

CROSS-REFERENCE TO RELATED APPLICATIONS

The present application is a continuation of U.S. patent application Ser. No. 12/538,147, filed Aug. 9, 2009, the disclosure of which is hereby incorporated by reference. U.S. patent application Ser. No. 12/538,147 claims the benefit of U.S. Provisional Patent Application No. 61/136,579, filed Sep. 16, 2008, the disclosure of which is hereby incorporated by reference.

TECHNICAL FIELD

The invention generally relates to image processing, and more particularly the invention relates to a system and method for synchronizing multiple imager systems output.

BACKGROUND

Video camera systems (also referred to as imager systems) have been used to acquire extended field of view (i.e., panoramic) and iMAX-type video images. Extended field of view or panoramic video images are useful in video surveillance, Geographic Information System (GIS) and media entertainment applications.

Existing imager systems equipped with normal lens have limited field of view, generally between 25 and 60 degrees. To provide extended field of view, some existing imager systems utilize wide-angle lens and fish-eye lens. However, wide-angle lens imager systems generally provide only up to 140 degrees of field of view and suffer perspective distortion near the edges and lower the ability to resolve detail. Fisheye lens imager systems provide 180 degrees field of view but suffer barrel distortion and lower the ability to resolve detail.

Multi-imager systems have been used to provide extended field of view (0 to 360 degrees) through post capture stitching of multiple images. If, however, the images are not captured time synchronized with uniform shutter configuration, they exhibit temporal distortion for moving objects when the objects cross imager boundaries.

SUMMARY

A synchronized multiple imager system includes a plurality of imagers having pixels arranged in rows and columns. The pixels generate pixel data responsive to light directed onto the imagers. One or more respective sensors are coupled to the imagers. The sensors sense the pixel data from the columns and output a vertical raster stream representative of the pixel data in the columns, thereby generating a plurality of vertical raster streams.

A clock circuit is coupled to the imagers. The clock circuit synchronizes the sensors to sense selected columns in the imagers and to output the vertical raster streams from the selected columns. A processor circuit is configured to receive the vertical raster streams from the imagers and to process the vertical raster streams to generate a plurality of stitched raster streams. The processor circuit stitches seam vertical raster streams from adjacent pairs of imagers.

The synchronized multiple imager system further includes a plurality of input buffers coupled to respective sensors. The input buffers are configured to receive the vertical raster streams and to transfer the vertical raster streams to the processor circuit.

The clock circuit includes input flip-flops configured to acquire the vertical raster stream from respective imagers in accordance with an imager bus clock. The clock circuit further includes asynchronous FIFOs coupled to the input flip-flops. The asynchronous FIFOs de-skew the vertical raster streams. The clock circuit includes a write FIFO configured to receive the vertical raster streams from the asynchronous FIFOs and to output synchronized vertical raster streams.

BRIEF DESCRIPTION OF THE DRAWINGS

For a more complete understanding of the features, example embodiments and possible advantages of the present invention, reference is now made to the detailed description of the invention along with the accompanying figures and in which.

DETAILED DESCRIPTION

In the detailed description herein, the following terms have their given meanings in addition to their plain and ordinary meanings: (1) de-skew refers to the process of aligning and synchronizing raster streams; (2) blending refers to the process of normalizing the color and brightness of seam column pixels to produce a seamless stitched panoramic image; and (3) line buffers refer to temporary location in a pipeline to store pixel data (FIG. 3, shows a line buffer for a vertical raster consisting of 2048 pixels with 16 bits (2 bytes) per pixel).

Figure 1:
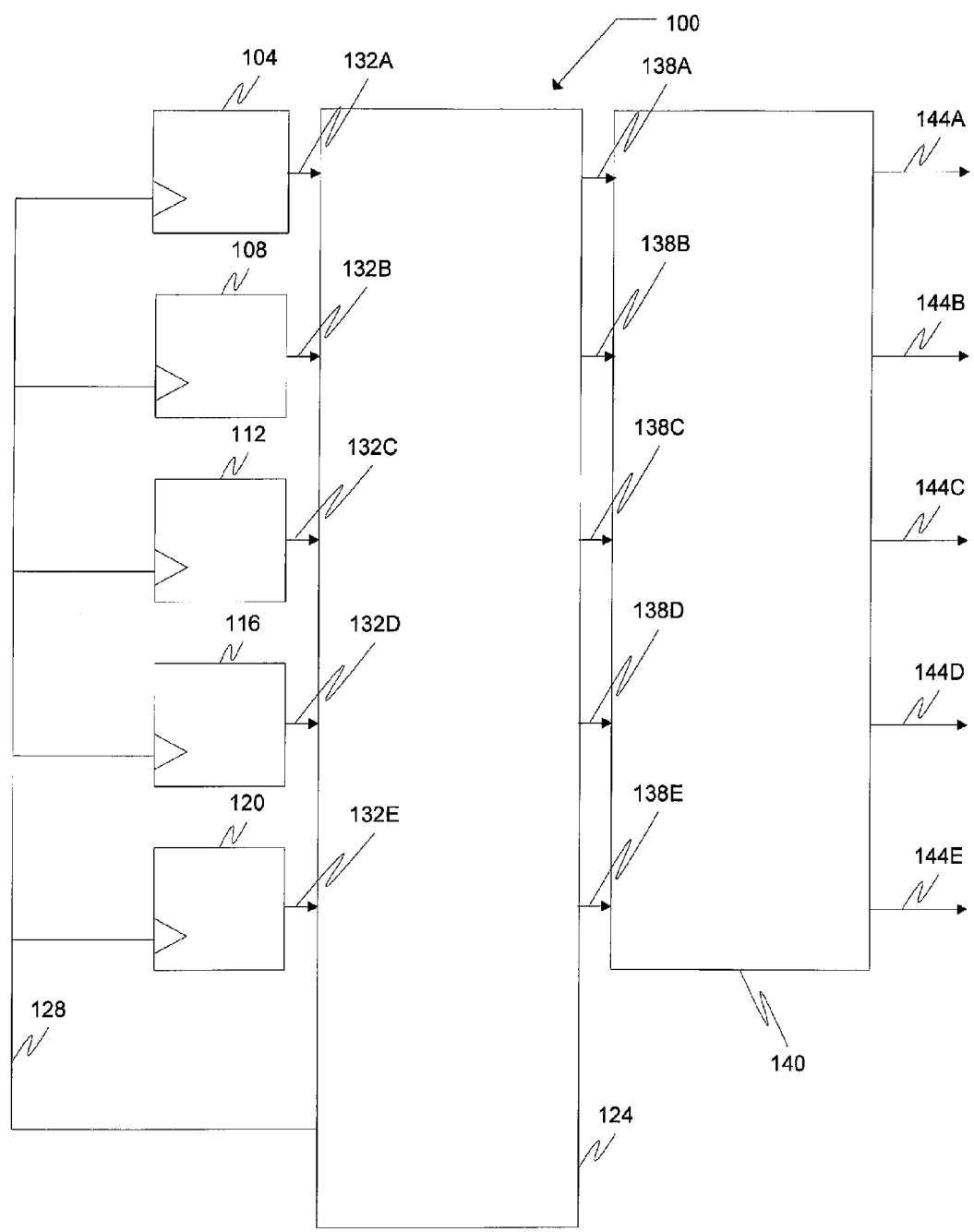
FIG. 1 illustrates a synchronized multiple imager system.
Figure 2:
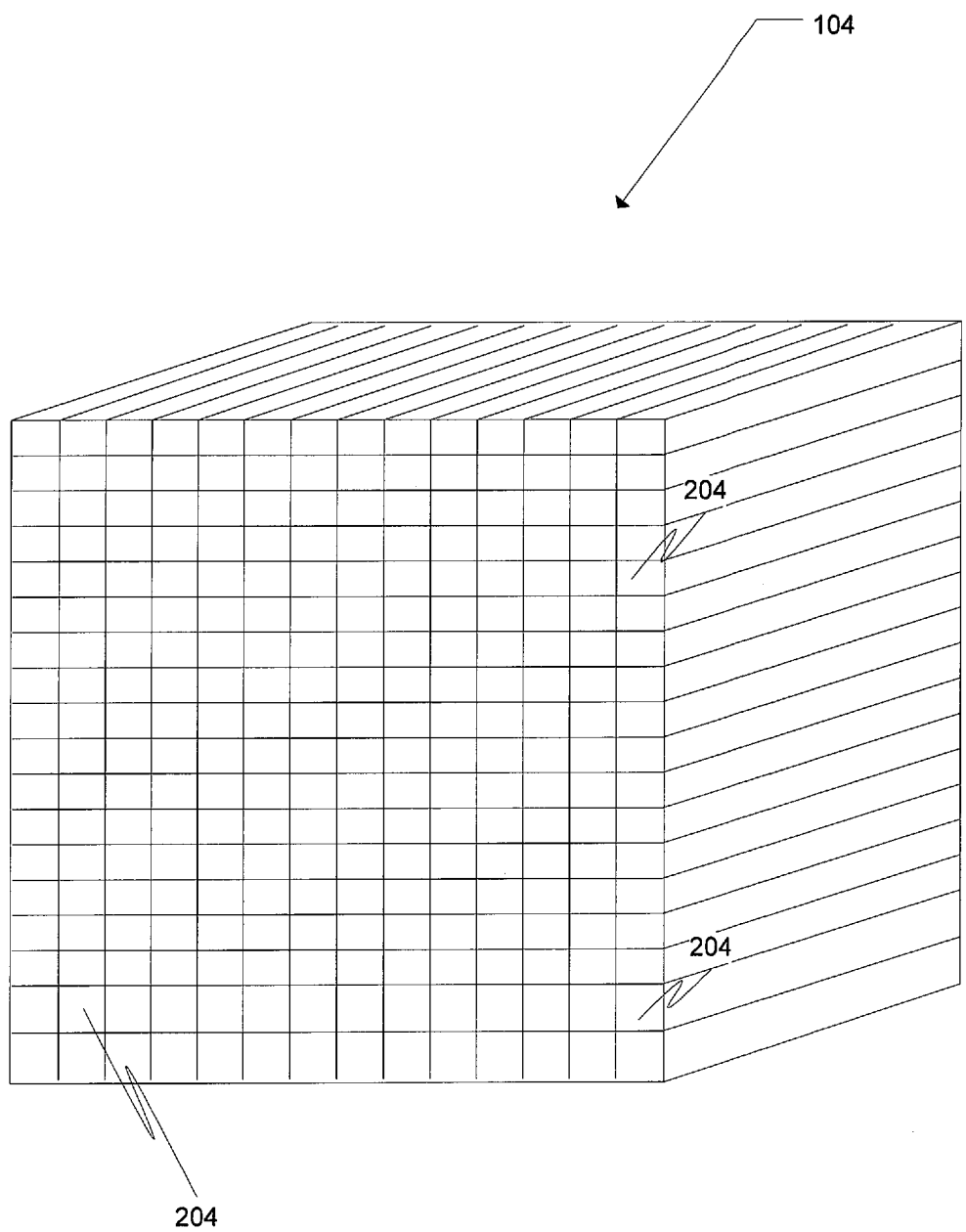
FIG. 2 illustrates an imager with pixels arranged in multiple rows and columns.

FIG. 1 illustrates a synchronized multiple imager system 100 in accordance with one embodiment. The system 100 includes a plurality of imagers 104, 108, 112, 116, and 120 coupled to a clock synchronization circuit 124. As illustrated in FIG. 2, the imager 104 has pixels 204 arranged in multiple rows and columns. Responsive to light directed onto the imagers, the pixels 204 generate pixel data which are sensed or read by one or more respective sensors (not shown in FIGS. 1 and 2) implemented in the imagers. As shown in FIG. 3, the pixel data is sensed from each column, and a vertical raster stream is generated representative of the pixel data in each column, thereby generating a plurality of vertical raster streams (1 through N) for each imager. In one implementation, the imagers are rotated by 90 degrees to enable sensing on a column by column basis.

The clock synchronization circuit 124 ensures that columns of the imagers are read in such an order that seam columns of two adjacent imagers are read simultaneously. The seam columns are a set of edge columns who are candidates for stitching of scenes from adjacent imagers. The number of seam columns selected for stitching depends on the overlap of scene between adjacent imagers. The overlap is caused by the slight variations in the imager and lens alignment and lens focus adjustments.

Figure 3:
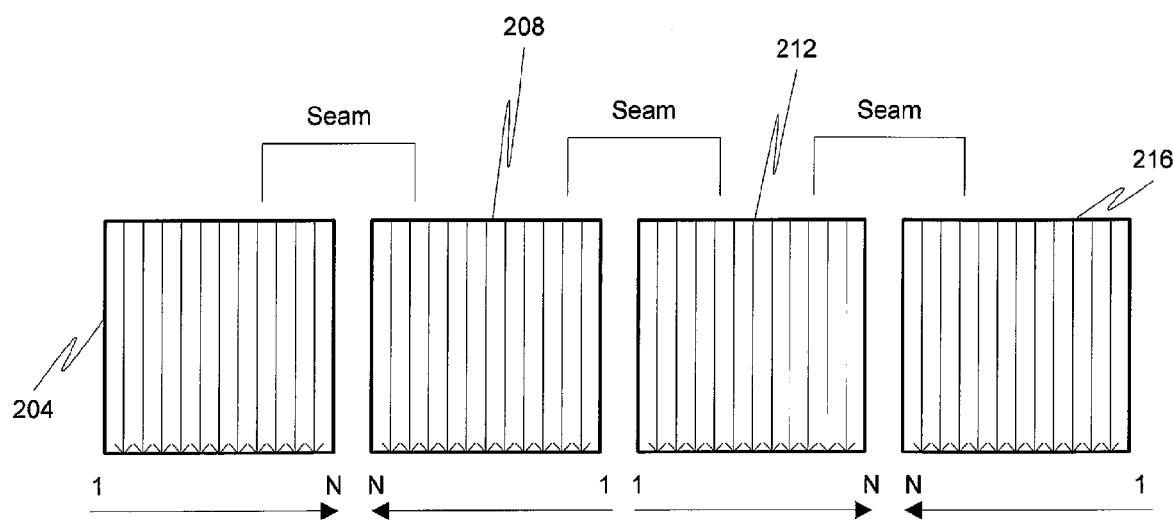
FIG. 3 illustrates generation of vertical raster streams.

FIG. 3 shows imagers 204, 208, 212, and 216, each including columns 1-N. The imagers 204 and 208 are adjacent imagers of which selected columns are considered seam columns. In one implementation, the sensors read out columns N of the imagers 204 and 208 simultaneously.

In FIG. 1, the clock synchronization circuit 124 applies a clock and reset signal 128 to the imagers, 104, 108, 112, 116 and 120. In response, vertical raster streams 132A, 132B, 132C, 132D and 132E from the respective imagers, 104, 108, 112, 116 and 120 are generated. The clock synchronization circuit 124 receives vertical raster streams 132A, 132B, 132C, 132D and 132E, and in response generates respective synchronized vertical raster streams 138A, 138B, 138C, 138D and 138E. A processor circuit 140 receives the synchronized vertical raster streams 138A, 138B, 138C, 138D and 138E and generates a plurality of stitched raster streams 144A, 144B, 144C, 144D and 144E. It will be appreciated that the term "stitching" refers to the process of combining multiple slightly overlapped images to create a single large panoramic image. More specifically, the process of "stitching" refers to modification of vertical raster streams from seam columns to create a panoramic or extended field of view image.

Figure 4:
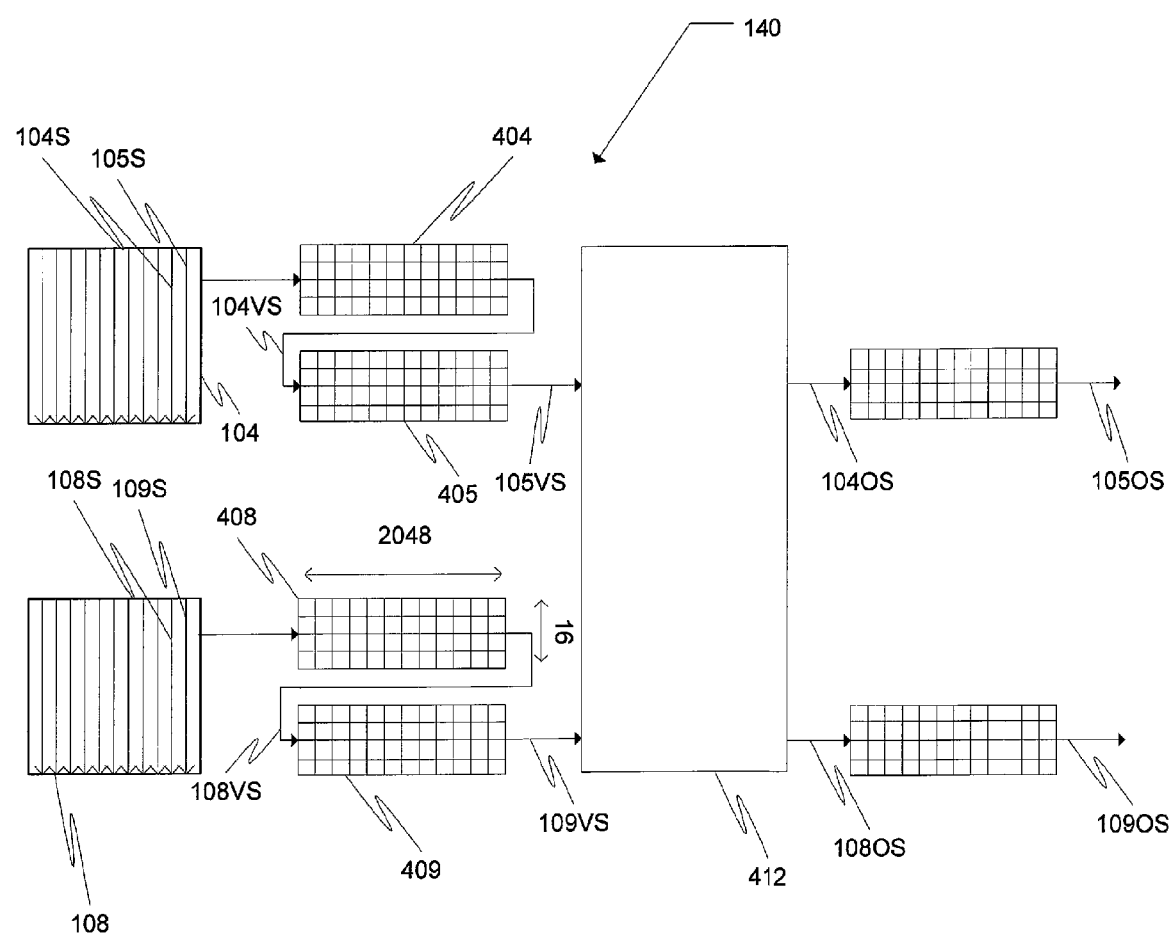
FIG. 4 illustrates a processor circuit connected to imagers.

In one implementation, the processor circuit 140 includes a plurality of input buffers each coupled to a respective sensor. Referring to FIG. 4, the processor circuit 140 includes input buffers 404 and 405 connected to the imager 104 and input buffers 408 and 409 connected to the imager 108. Two successive columns 104S and 105S and 108S and 109S from each of the imagers 104 and 108 respectively, are sensed or read. Accordingly, four vertical raster streams, two from each of the imagers 104 and 108, are loaded into the input buffers 404,405 and 408,409 respectively. The vertical raster stream 105VS from the column 105S of the imager 104 is loaded into the input buffer 405 while the vertical raster stream 109VS from the column 109S of the imager 108 is loaded into the input buffer 409. Similarly the vertical raster stream 104VS from the column 104S of the imager 104 is loaded into input buffer 404, while the vertical raster stream 108VS from the column 108S of the imager 108 is loaded into input buffer 408.

The columns of the imagers 104 and 108 are read in an order to ensure that seam columns of the imagers are read simultaneously. As shown in FIG. 4, two seam columns 104S and 105S and 108S and 109S of the respective imagers 104 and 108 are sensed simultaneously. Two vertical raster streams 104VS and 105VS from the imager 104 are loaded into the input buffers 404 and 405 respectively, and two vertical raster streams 108VS and 109VS from the imager 108 are loaded into the input buffers 408 and 409 respectively. The vertical raster streams 104VS, 105VS, 108VS and 109VS are processed by a processor 412, which generates output streams 104OS, 105OS, 108OS and 109OS. More specifically, the processor 412 performs a de-warping and stitching operation, if required, on the vertical raster streams 104VS, 105VS and generates the output stream 104OS and 105OS. Likewise, the processor 412 performs de-warping and stitching operations, if required, on the vertical raster streams and generates the output stream 108OS and 109OS. The term "dewarping" refers to the process of perspective correction of the image to reverse the effects of geometric distortions caused by the lens. In one implementation, the processor 412 performs de-warping operations on all columns but performs stitching operations on the seam columns to stitch the images acquired by adjacent imagers.

Figure 5:
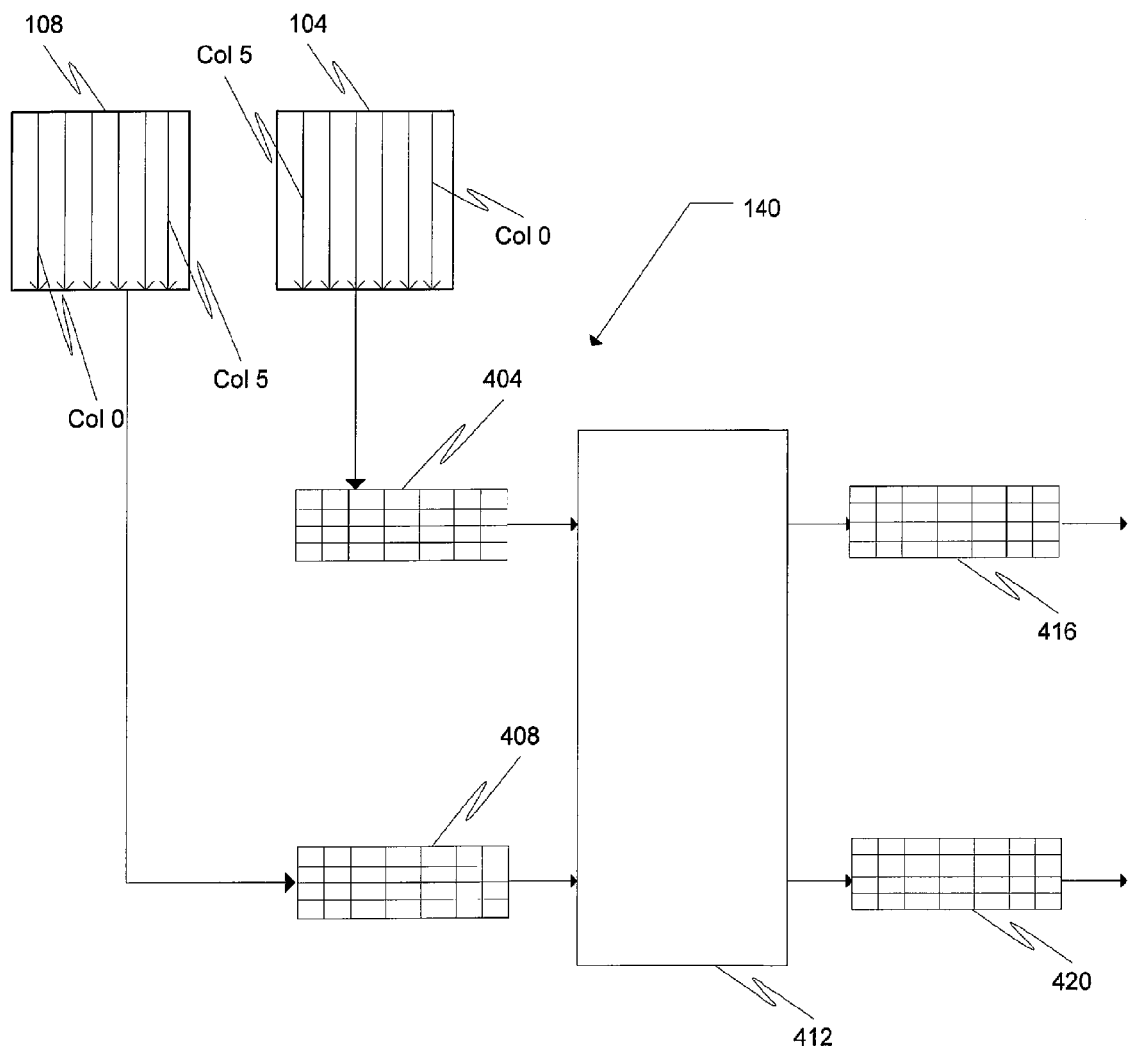
FIG. 5 illustrates a de-warping and stitching process.

FIG. 5 illustrates a de-warping and stitching operation in accordance with one embodiment. The imagers 104 and 108 are shown each having pixels arranged in 6 columns, Col_0-Col_5. Six vertical raster streams are generated from the imager 104, namely VS104_Col_0-VS104_Col_5. Similarly, six vertical raster streams are generated from the imager 108, namely VS108_Col_0-VS108_Col_5. One vertical raster stream from each imager is loaded simultaneously into a respective input buffer and processed by the processing circuit 412.

The vertical raster streams VS104_Col_5 and VS108_Col_5 are generated from seam columns. Table I and II below describes the processing of the vertical raster streams. Specifically, in Table I only one seam column is used from each of the imagers 104 and 108 for stitching. In Table II, two seam columns from each of the imagers are used for stitching.

Dewarping+Stitching a seam represented by 2 column (also see FIG. 5)

TABLE I

| TIME (ms) | INPUT BUFFER 404 | INPUT BUFFER 408 | OUTPUT BUFFER 416 | OUTPUT BUFFER 420 |
|---|---|---|---|---|
| 0 | N/A | N/A | N/A | N/A |
| 10 | VS_104_Col_0 | VS_108_Col_0 | N/A | N/A |
| 20 | VS_104_Col_1 | VS_108_Col_1 | Dewarped (VS_104_Col_0) | Dewarped (VS_108_Col_0) |
| 30 | VS_104_Col_2 | VS_108_Col_2 | Dewarped (VS_104_Col_1) | Dewarped (VS_108_Col_1) |
| 40 | VS_104_Col_3 | VS_108_Col_3 | Dewarped (VS_104_Col_2) | Dewarped (VS_108_Col_2) |
| 50 | VS_108_Col_4 | VS_108_Col_4 | Dewarped (VS_104_Col_3) | Dewarped (VS_108_Col_3) |
| 60 | VS_104_Col_5 | VS_104_Col_5 | Dewarped (VS_104_Col_4) | Dewarped (VS_108_Col_4) |
| 70 | N/A | N/A | Stitched_Dewarped (VS_104_Col_5) | Stitched_Dewarped (VS_108_Col_5) |
| 80 | N/A | N/A | N/A | N/A |
| 90 | N/A | N/A | N/A | N/A |
| 100 | N/A | N/A | N/A | N/A |
| 110 | New Frame VS_104_Col_0 | New Frame VS_108_Col_0 | N/A | N/S |
| 120 | New Frame VS_104_Col_1 | New Frame VS_108_Col_1 | Dewarped (VS_104_Col_0) | Dewarped (VS_108_Col_0) |
| 130 | | | | |
| 140 | | | | |
| 150 | | | | |
| 160 | | | | |
| 170 | | | | |
| 180 | | | | |

Dewarping+Stitching a seam represented by 4 column (also see FIG. 4)

TABLE II

| TIME (ms) | INPUT BUFFER 404 | INPUT BUFFER 405 | INPUT BUFFER 408 | INPUT BUFFER 409 | OUTPUT BUFFER 416 | OUTPUT BUFFER 420 |
|---|---|---|---|---|---|---|
| 0 | N/A | N/A | N/A | N/A | N/A | N/A |
| 10 | VS_104_Col_0 | N/A | VS_108_Col_0 | N/A | N/A | N/A |
| 20 | VS_104_Col_1 | VS_104_Col_0 | VS_108_Col_1 | VS_108_Col_0 | Dewarped (VS_104_Col_0_Col1) | Dewarped (VS_108_Col_0_Col1) |
| 30 | VS_104_Col_2 | VS_104_Col_1 | VS_108_Col_2 | VS_108_Col_1 | Dewarped (VS_104_Col_1_Col2) | Dewarped (VS_108_Col_1_Col2) |
| 40 | VS_104_Col_3 | VS_104_Col_2 | VS_108_Col_3 | VS_108_Col_2 | Dewarped (VS_104_Col_2_Col3) | Dewarped (VS_108_Col_2_Col3) |
| 50 | VS_104_Col_4 | VS_104_Col_3 | VS_108_Col_4 | VS_108_Col_3 | Dewarped (VS_104_Col_3_Col4) | Dewarped (VS_108_Col_3_Col4) |
| 60 | VS_104_Col_5 | VS_104_Col_4 | VS_104_Col_5 | VS_104_Col_4 | Dewarped (VS_104_Col_4_Col5) | Dewarped (VS_108_Col_4_Col5) |
| 70 | N/A | N/A | N/A | N/A | Stitched_Dewarped (VS_104_Col4_Col_5) | Stitched_Dewarped (VS_108_Col_4_Col_5) |
| 80 | N/A | N/A | N/A | N/A | N/A | N/A |
| 90 | N/A | N/A | N/A | N/A | N/A | N/A |
| 100 | N/A | N/A | N/A | N/A | N/A | N/A |
| 110 | New Frame VS_104_Col_0 | New Frame N/A | New Frame VS_108_Col_0 | New Frame N/A | N/A | N/S |
| 120 | New Frame VS_104_Col_1 | New Frame VS_104_Col_0 | New Frame VS_108_Col_1 | New Frame VS_108_Col_0 | Dewarped (VS_104_Col_0_Col1) | Dewarped (VS_108_Col_0_Col1) |
| 130 | | | | | | |
| 140 | | | | | | |
| 150 | | | | | | |
| 160 | | | | | | |
| 170 | | | | | | |
| 180 | | | | | | |

As shown in Table I above, at time T=10 ms, a vertical raster stream VS_104_Col_0 from the imager 104, column 0 is loaded into the input buffer 404, and a vertical raster stream VS_108_Col_0 from the imager 108, column 0 is loaded into the input buffer 408. The output buffers 416 and 420 are empty at time T=10 ms.

At time T=20 ms, the processing circuit 412 de-warps VS_104_Col_0 to generate Dewarped(VS_104_Col_0) which is loaded into the output buffer 416. Simultaneously, the processing circuit 412 de-warps VS_108_Col_0 to generate Dewarped(VS_108_Col_0) which is loaded into the output buffer 420. Also, at time T=20 ms, VS_104_Col_1 from the imager 104 is loaded into the input buffer 404, and VS_108_Col_1 is loaded into the input buffer 408. The process is repeated for columns 1-4 of the imagers 104 and 108.

At time T=70 ms, the processing circuit 412 de-warps and stitches the vertical raster streams from the seam columns (i.e., column 5). Accordingly, at time T=70 ms, the processing circuit 412 de-warps and stitches VS_104_Col_5 to generate Stitched_Dewarped(VS_104_Col_5) which is loaded into the output buffer 416. Simultaneously, the processing circuit 412 de-warps and stitches VS_108_Col_5 to generate Stitched_Dewarped(VS_108_Col_5) which is loaded into the output buffer 420. It will be appreciated, at time T=70 ms, the input buffers 404 and 408 are empty because the pixel data from all of the columns (0-5) of the imagers 104 and 108 have been sensed.

Between times T=80 ms to T=100 ms, no processing is conducted. At time T=110 ms, the foregoing process is repeated for a new frame. While the foregoing process is illustrated for two imagers 104 and 108, it will be understood the process is applicable to a system having more than two imagers. For example, the foregoing process is applicable to a system having 5 or more imagers.

In one embodiment, the relationships between Stitched_Dewarped(VS_104_Col_5), Stitched_Dewarped(VS_108_Col_5) and VS_104_Col_5, VS_108_Col_5 are represented by the following equations:

$$\text{Stitched\_Dewarped}(VS\_104\_Col\_5) = [\text{Dewarped}(VS\_104\_Col\_5) - \{\text{Dewarped}(VS\_104\_Col\_5) - \text{Dewarped}(VS\_108\_Col\_5)\}/\text{Blend Constant}] \quad (1)$$

$$\text{Stitched\_Dewarped}(VS\_108\_Col\_5) = [\text{Dewarped}(VS\_108\_Col\_5) - \{\text{Dewarped}(VS\_108\_Col\_5) - \text{Dewarped}(VS\_104\_Col\_5)\}/\text{Blend Constant}] \quad (2)$$

The Blend Constant may be set to 4, 5, 6 or any other appropriate value. The method of generating a dewarped raster stream (e.g., Dewarped(VS_104_Col_1) from a vertical raster stream (e.g., VS_104_Col_1) will be understood by those skilled in the art.

Consider, for example, the following vertical raster values were obtained from the imagers 104 and 108:

VS_104_Col_5=54

VS_108_Col_5=127

Next, using well known methods, the following dewarped values are calculated:

Dewarped(VS_104_Col_5)=60

Dewarped(VS_108_Col_5)=140

Next, using equations (1) and (2), the following stitched values are calculated:

Stitched_Dewarped(VS_104_Col_5)=80

Stitched_Dewarped(VS_108_Col_5)=120

The Stitched_Dewarped values may be stored in a memory (e.g., DRAM).

Figure 6:
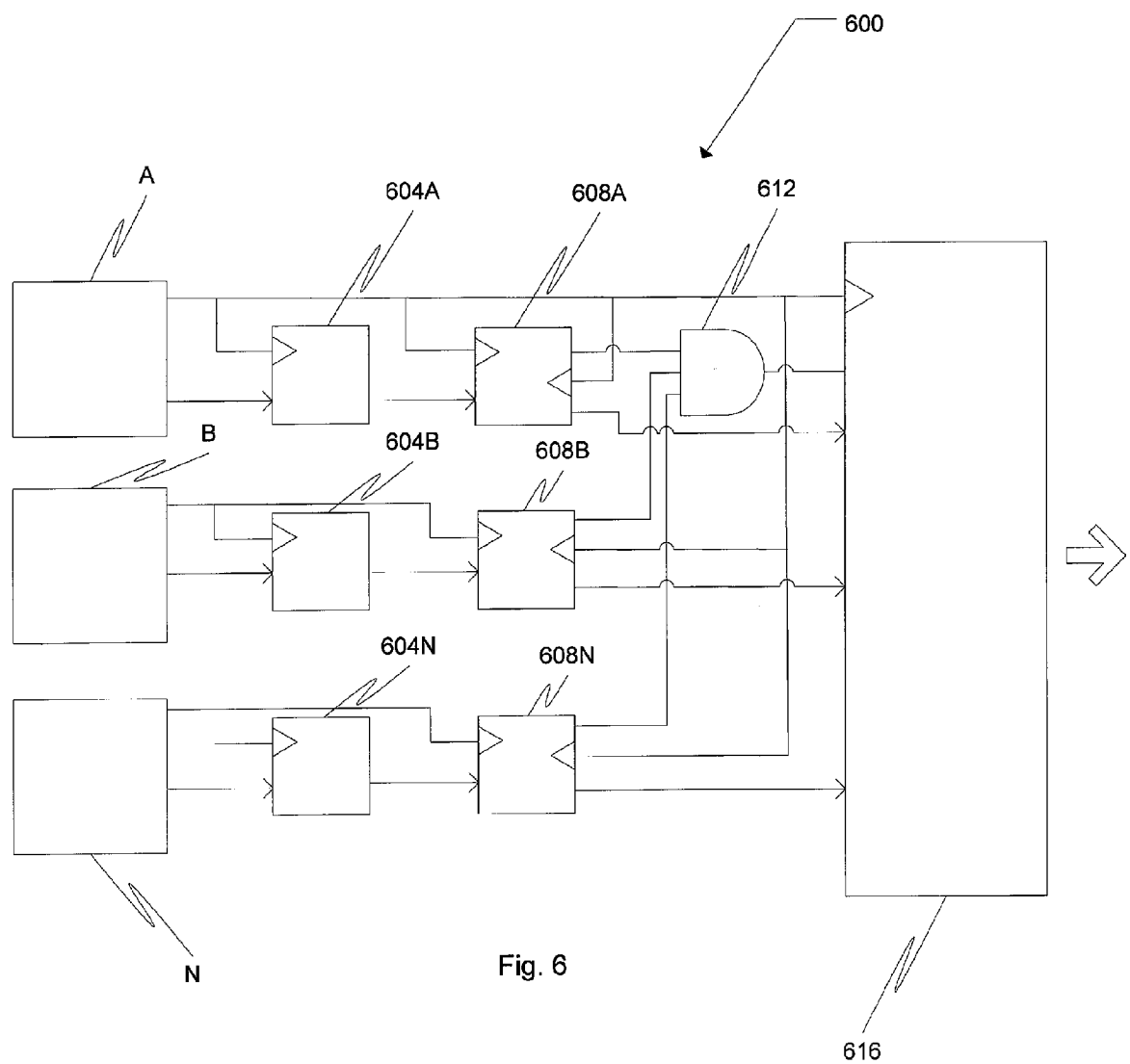
FIG. 6 illustrates a clock synchronization circuit.

FIG. 6 illustrates a clock synchronization circuit 600 in accordance with one embodiment. The clock synchronization circuit 600 synchronizes a plurality of Imagers A-N. The pixel bus data from the Imagers A-N are transferred to respective input flip-flops 604A-N.

The pixel bus data from the input flip flops 604A-N are passed through respective asynchronous FIFOs 608A-N to de-skew the image. The FIFOs 608A-N are coupled to an AND gate 612 which enables the bus data transfer under a single clock domain (e.g., Imager A's clock). The pixel bus data from the FIFOs 608A-N are transferred to a write FIFO 616. The pixel bus data from the write FIFO 616 may be transferred to a processor circuit for dewarping and stitching.

It will be appreciated that the synchronized multiple imager system including its various components and elements depicted in the drawings/figures and described above can be implemented in programmable hardware like FPGAs and in ASICs. Also, the synchronized multiple imager system can be implemented as a standalone hardware component or integrated with other image processing systems as a subsystem.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed is:

1. A synchronized multiple imager system, comprising:
a plurality of imagers having pixels arranged in multiple rows and columns; the pixels operable to generate pixel data responsive to light directed onto the imagers;
one or more respective at least first and second sensors coupled to the imagers, the sensors operable to sense the pixel data from the columns and output vertical raster streams representative of the pixel data in the columns, wherein the first sensor reads out columns from left to right, and the second sensor is adjacent to the first sensor and reads out columns from right to left;
a clock circuit coupled to the imagers and operable to synchronize the sensors to sense selected columns in the imagers and to output the vertical raster streams from the selected columns; and
a processor circuit configured to receive the vertical raster streams from the imagers and operable to process the vertical raster streams to generate a plurality of stitched raster streams so as to create a panoramic video image.

2. The synchronized multiple imager system of claim 1, wherein the processor circuit processes seam vertical raster streams from pairs of adjacent imagers, wherein the seam vertical raster streams are generated from seam columns, and wherein a number of the seam columns selected for stitching depends on an overlap of scene between the adjacent imagers in each pair.

3. The synchronized multiple imager system of claim 1, further comprising one or more input buffers coupled to a respective sensor, the input buffers configured to receive the vertical raster streams and forward the vertical raster streams to the processor circuit.

4. The synchronized multiple imager system of claim 1, wherein the pixel data in the imager is sensed on a column by column basis, and wherein the vertical raster stream from a column of the pixels is loaded into an input buffer.

5. The synchronized multiple imager system of claim 1, wherein the vertical raster streams are de-warped by the processor circuit to reverse effects of geometric distortions caused by a lens.

6. The synchronized multiple imager system of claim 1, wherein the clock circuit includes input flip-flops configured to acquire the vertical raster streams from respective imagers.

7. The synchronized multiple imager system of claim 6, wherein the clock circuit includes asynchronous FIFOs coupled to the input flip-flops, the asynchronous FIFOs operable to de-skew the vertical raster streams.

8. The synchronized multiple imager system of claim 1, wherein the clock circuit includes a write FIFO configured to receive the vertical raster streams from the asynchronous FIFOs and operable to output synchronized vertical raster streams.

9. The synchronized multiple imager system of claim 1, wherein the system is implemented in a programmable hardware.

10. The synchronized multiple imager system of claim 1, wherein the system is implemented in an ASIC.

11. The synchronized multiple imager system of claim 1 further comprising:
third and fourth sensors coupled to the imagers, wherein the third sensor is adjacent to the second sensor and reads out columns from left to right, and the fourth sensor is adjacent to the third sensor and reads out columns from right to left.

12. A method of generating a panoramic video using a synchronized multiple imager system, the method comprising:

acquiring segments of the panoramic video using a plurality of imagers, each imager configured to acquire a segment of an image, the imagers having pixels arranged in multiple rows and columns, the pixels operable to generate pixel data responsive to the segment acquired by a respective imager;

sensing the pixel data in the columns using one or more respective sensors coupled to the imagers, the sensors operable to sense the pixel data from the columns in the imagers and output vertical raster streams representative of the pixel data;

synchronizing the sensors using a clock circuit coupled to the imagers, wherein the clock circuit is operable to synchronize the sensors to sense the pixel data in selected columns in the imagers and to output the vertical raster streams from the selected columns, wherein the clock circuit acquires the vertical raster stream from a respective imager using input flip-flops in accordance with an imager bus clock and de-skews the vertical raster streams using asynchronous FIFOs coupled to the input flip-flops; and receiving one or more vertical raster streams from the imagers by a processor circuit which is operable to process the vertical raster streams to generate a plurality of stitched raster streams which are used to generate the panoramic video.

13. The method of claim 12, wherein the processor circuit processes seam vertical raster streams from pairs of adjacent imagers, wherein the seam vertical raster streams are generated from seam columns, and wherein a number of the seam columns selected for stitching depends on an overlap of scene between the adjacent imagers in each pair.

14. The method of claim 12, further comprising:
receiving the vertical raster streams by a plurality of input buffers coupled to a respective sensor; and
forwarding the vertical raster streams by the input buffers to the processor circuit.

15. The method of claim 12, wherein the pixel data in the imager is sensed on a column by column basis, and wherein the vertical raster streams from the columns are loaded into an input buffer.

16. The method of claim 12, wherein the vertical raster streams are de-warped by the processor circuit to reverse effects of geometric distortions caused by a lens.

17. The method of claim 12 further comprising:
receiving the vertical raster streams by the clock circuit from the asynchronous FIFOs; and outputting synchronized vertical raster streams by the clock circuit.

18. The method of claim 12, wherein the method is performed by programmable hardware.

19. The method of claim 12, wherein the method is performed by an ASIC.

20. An integrated circuit comprising:
a plurality of imagers configured to acquire a segment of an image, the imagers having pixels arranged in multiple rows and columns, the pixels operable to generate pixel data responsive to the segment acquired by the respective imager;
one or more sensors coupled to the imagers, the sensors operable to sense the pixel data from the columns and output vertical raster streams representative of the pixel data;
a clock circuit coupled to the imagers and operable to synchronize the sensors to sense selected columns in the imagers, output the vertical raster streams from the selected columns, and deskew the vertical raster streams using asynchronous first-in-first-out buffers;
a plurality of input buffers coupled to the sensors, the input buffers configured to receive the vertical raster streams; and
a processor circuit coupled to the input buffers, the processor circuit configured to receive the vertical raster streams from the input buffers and operable to generate a plurality of stitched raster streams so as to create a video stream having an extended field of view image.

21. The integrated circuit of claim 20, wherein the pixel data in the imager is sensed on a column by column basis, and wherein the vertical raster stream from a column of the pixels is loaded into an input buffer.

22. The integrated circuit of claim 20, wherein the vertical raster streams are de-warped by the processor circuit to reverse effects of geometric distortions caused by a lens.

23. The integrated circuit of claim 20, wherein the stitched raster streams are generated using seam vertical raster streams from pairs of adjacent imagers, wherein the seam vertical raster streams are generated from seam columns, and wherein a number of the seam columns selected for stitching depends on an overlap of scene between the adjacent imagers in each pair.

24. The integrated circuit of claim 20, wherein the integrated circuit comprises programmable hardware.

25. The integrated circuit of claim 20, wherein the integrated circuit comprises an ASIC.

* * * * *